United States Patent

Markovs

[11] Patent Number: 5,989,506
[45] Date of Patent: Nov. 23, 1999

[54] PROCESS FOR THE REMOVAL AND RECOVERY OF MERCURY FROM HYDROCARBON STREAMS

[75] Inventor: John Markovs, Arlington Heights, Ill.

[73] Assignee: UOP LLC, Des Plaines, Ill.

[21] Appl. No.: 08/769,027

[22] Filed: Dec. 18, 1996

[51] Int. Cl.⁶ .................................................. B01D 53/64
[52] U.S. Cl. ...................... 423/210; 95/134; 208/251 R; 210/673; 210/679
[58] Field of Search ............................. 95/134; 423/210; 208/251 R; 210/673, 679

[56] References Cited

U.S. PATENT DOCUMENTS

| | | | |
|---|---|---|---|
| 4,196,173 | 4/1980 | deJong et al. | 423/210 |
| 4,500,327 | 2/1985 | Nishino et al. | 55/72 |
| 4,591,490 | 5/1986 | Horton | 423/210 |
| 4,892,567 | 1/1990 | Yan | 55/33 |
| 5,062,948 | 11/1991 | Kawazoe | 208/251 R |
| 5,223,145 | 6/1993 | Markovs | 423/210 |
| 5,271,760 | 12/1993 | Markovs et al. | 75/670 |
| 5,281,258 | 1/1994 | Markovs | 95/120 |
| 5,281,259 | 1/1994 | Markovs | 95/134 |
| 5,354,357 | 10/1994 | Markovs | 95/134 |
| 5,419,884 | 5/1995 | Weekman | 208/253 |
| 5,510,565 | 4/1996 | Tan | 585/823 |
| 5,523,067 | 6/1996 | Markovs | 423/99 |

Primary Examiner—Wayne Langel
Assistant Examiner—Peter DiMauro
Attorney, Agent, or Firm—Thomas K. McBride; John G. Tolomei; Richard P. Silverman

[57] ABSTRACT

The invention relates to a process for removing and recovering mercury, an impurity, from a hydrocarbon feedstream. The process comprises separating the hydrocarbon feedstream into a gaseous portion and a liquid hydrocarbon portion and separately treating the gaseous and liquid portions by adsorption in separate purifier beds. The gas and liquid purifier beds are regenerated sequentially with a heated regenerant stream that following desorption and recovery of mercury is further purified in a secondary regenerable adsorption bed. The sequential regeneration of the two separate purifier beds and the secondary adsorbent bed significantly reduces the capital and operating cost for the process and serves to concentrate the mercury in the secondary adsorbent bed where it can be removed at a lower cost.

12 Claims, 1 Drawing Sheet

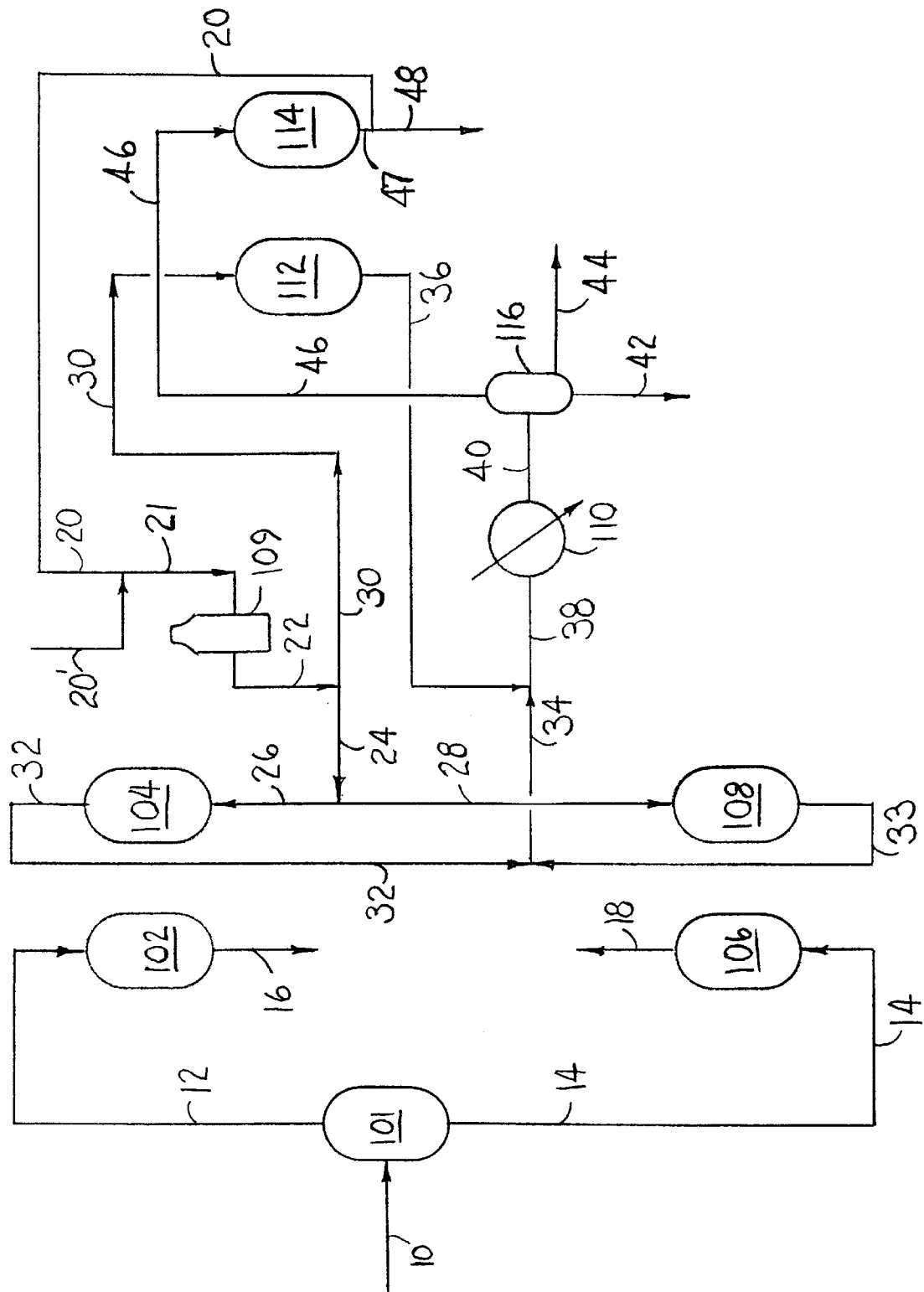

PROCESS FOR THE REMOVAL AND RECOVERY OF MERCURY FROM HYDROCARBON STREAMS

FIELD OF THE INVENTION

This invention relates in general to the removal of mercury present as an impurity in hydrocarbon streams, and more particularly to the removal and the recovery of mercury from gaseous and liquid hydrocarbons.

BACKGROUND OF THE INVENTION

Mercury is an undesirable impurity found in many petrochemical process streams and in much of the natural gas found throughout the world. The mercury impurity present in such streams is generally in the form of elemental mercury, but in some instances the mercury is in the form of mercury compounds, including organic mercury compounds. Mercury impurities in process streams, particularly light hydrocarbon streams, that is, wherein the light hydrocarbons comprise methane ($C_1$) through $C_{10}$ hydrocarbons, may cause in corrosion problems in process equipment or poison sensitive downstream catalytic processes. Consequently, a considerable number of methods and schemes have been devised to selectively remove the mercury. The purification processes are most often based on adsorption technology wherein the mercury is selectively adsorbed on to the adsorbent. Some of these processes involve the use of non-regenerable adsorbents, but technology based on non-regenerable adsorbents usually results in the production of a solid adsorbent loaded with mercury and thus presents a hazardous waste disposal problem. The most commonly used adsorbent for the removal of mercury is an activated carbon as a support for a mercury reactive material such as potassium triodide, sulfur, sulfuric acid, chlorine, silver, copper, or various salts of silver or copper. Other supports for mercury reactive materials include silicas, aluminas, silica-aluminas, and zeolitic aluminosilicates. Ion-exchange resins, particularly the strong basic anion-exchange types which have been reacted with a polysulfide, have also been reported as useful mercury adsorbents. See U.S. Pat. No. 4,591,490 (Horton) in this latter regard. The disclosures of U.S. Pat. No. 4,500,327 (Nishino) and U.S. Pat. No. 4,196,173 (de Jong et al.) are relevant to the use of activated carbon support for mercury reactive materials. U.S. Pat. No. 5,523,067 relates to processing both gas and liquid hydrocarbon streams containing mercury.

U.S. Pat. No. 5,281, 258 to Markovs discloses a process for removing mercury vapor from a natural gas stream which comprises mercury and water. The natural gas stream is passed through a first fixed bed adsorber containing a regenerable adsorbent which adsorbs mercury and water and a purified effluent is recovered. The flow of the natural gas stream to the first adsorber bed is terminated and a heated purge desorbent stream is passed through the first adsorbent bed to desorb mercury and water to produce a spent regenerant. The spent regenerant is cooled and condensed to recover liquid mercury and water. The remainder of the spent regenerant is passed to a second fixed bed adsorber containing a regenerable adsorbent with a strong affinity for adsorbing water to produce a second effluent, decreased in water. The second effluent is cooled and condensed to condense out a portion of the mercury from the second effluent. The second fixed bed adsorber is regenerated with a portion of the heated purge desorbent and is not recovered. The second fixed bed adsorber is required to remove water prior to the condensing out of the mercury to prevent hydrate formation.

U.S. Pat. No. 5,281,259 to Markovs discloses a process for the removal of mercury from a natural gas stream wherein the mercury vapor contained in the purge gas used to regenerate the adsorption beds is recovered as liquid mercury. In this scheme, a primary spent purge desorbent from a primary bed undergoing desorption is cooled and condensed to recover mercury and water and the remaining material is passed to a secondary bed containing a regenerable adsorbent for mercury to produce a second effluent stream depleted in mercury. Another secondary bed undergoing regeneration at the same time as the primary bed is purged with a portion of the purge desorbent to produce a secondary spent regenerant. The secondary spent regenerant is combined with the primary spent desorbent prior to the cooling and condensing step.

U.S. Pat. No. 5,271,760 to Markovs discloses a process for the removal of mercury from a process feedstream to recover liquid mercury. The process comprises the passing of the feedstream periodically in sequence through two fixed beds containing a regenerable adsorbent selective for the adsorption of mercury. Each of the beds cyclically undergoes an adsorption step wherein the feedstream is passed through the bed to selectively adsorb mercury and to produce an effluent stream, and a purge desorption step wherein the adsorbed mercury is desorbed by passing a regeneration fluid through the bed to produce a second effluent. The improvement comprises the tandem operation of the beds so that as one bed is operating in the adsorption step, the other bed is operating in the purge desorption step and the second effluent is cooled and condensed to recover a portion of the mercury. Markovs further discloses that the remainder of the second effluent is recombined with the feedstream and passed to the bed undergoing adsorption. The above U.S. Pat. Nos. 5,281,258, 5,281,259, and 5,271,760 are hereby incorporated by reference.

Perhaps the two greatest problems involved in removing mercury from process streams are (a) achieving a sufficient reduction in the mercury concentration of the feedstream being treated and (b) avoiding the reentry of the recovered mercury into some other environment medium. Although permissible levels of mercury impurity vary considerably, depending upon the ultimate intended use of the purified product, for purified natural gas, a mercury concentration greater than about 0.01 microgram per normal cubic meter ($\mu g/Nm^3$) is considered undesirable, particularly in those instances in which the natural gas is to be liquefied by cryogenic processing. To attain lower concentration levels requires the use of relatively large adsorption beds and relatively low mercury loading. If non-regenerable, the capital and adsorbent costs are uneconomical, and if regenerable, the regeneration media requirements are not only large, but also result in a large mercury-laden bed effluent which must itself be disposed of in an environmentally safe manner. Furthermore, the high volume of regeneration gas required to be first heated and then cooled to recover the mercury can result in oversized regeneration equipment which increases the capital and utility costs of the process installation.

Purification processes are sought for the efficient removal and recovery of mercury from hydrocarbon streams with a minimum of process equipment.

Purification processes are sought for the high recovery of mercury from both gaseous and liquid hydrocarbon streams.

SUMMARY OF THE INVENTION

The invention provides a process for the removal and recovery of mercury as a liquid stream from a hydrocarbon feedstream. The process of the present invention employs a sequential adsorbent regeneration procedure which permits the use of a single, common regenerant heater and mercury recovery facilities which result in lower capital and operating costs than a scheme which combines spent regenerant.

The invention relates to a process for recovering and removing mercury from a gaseous stream comprising $C_1$–$C_3$ hydrocarbons water, and mercury and a liquid hydrocarbon stream comprising $C_3$+ hydrocarbons, water, and mercury. The process comprises a series of steps. The gaseous stream is passed to a first gas purifier bed of at least two gas purifier beds. Each of the gas purifier beds is a fixed bed containing a first regenerable adsorbent selective for the adsorption of mercury and water to provide a treated gas effluent which has a reduced amount of mercury relative to the gaseous stream. The liquid hydrocarbon stream is passed to a first liquid purifier bed of at least two liquid purifier beds. Each liquid purifier bed is a fixed bed containing a second regenerable adsorbent selective for the adsorption of mercury and water to produce a treated liquid effluent which has a reduced amount of mercury relative to the liquid hydrocarbon stream. The first gas purifier bed and said first liquid purifier bed are regenerated sequentially with a heated regenerant stream to produce a first and a second spent regenerant stream. The spent regenerant streams are sequentially passed to a common mercury recovery zone to provide a cooled regenerant stream, a water stream and a mercury stream. The cooled regenerant stream is passed to a first secondary adsorption bed of at least two secondary adsorption beds. Each secondary adsorption bed is a fixed bed containing a third regenerable adsorbent selective for the adsorption of mercury to provide a purified gas stream. The passing of the cooled regenerant stream to the first secondary adsorption bed is terminated prior to mercury breakthrough, and the first secondary adsorption bed is regenerated to provide a third spent regenerant stream. The third regenerant stream is passed sequentially to the common mercury removal zone. The above steps are repeated to provide a continuous process.

In another embodiment, the present invention is a process for recovering and removing mercury from a hydrocarbon feedstream comprising $C_1$–$C_{10}$ hydrocarbons, water, and mercury. The process comprises a series of steps. The hydrocarbon feedstream is separated in a separation zone to provide a gaseous stream and a liquid hydrocarbon stream. The gaseous stream comprises $C_1$–$C_3$ hydrocarbons and the liquid hydrocarbon stream comprises $C_3$+ hydrocarbons. Both the gaseous stream and the liquid hydrocarbon stream also comprises water and mercury. The gaseous stream is passed to a first gas purifier bed of at least two gas purifier beds. Each of the gas purifier beds is a fixed bed containing a first regenerable adsorbent selective for the adsorption of mercury and water. The liquid hydrocarbon stream is passed to a first liquid purifier bed of at least two liquid purifier beds. Each liquid purifier bed is a fixed bed containing a second regenerable adsorbent selective for the adsorption of mercury and water. The first gaseous purifier bed produces a treated gas effluent having a reduced amount of mercury relative to the gaseous stream and the liquid purifier produces a treated liquid effluent stream having a reduced amount of mercury relative to the liquid hydrocarbon stream. The passing of the gaseous stream to the first gas purifier bed is terminated prior to mercury breakthrough and the passing of the liquid hydrocarbon stream to the first liquid purifier bed is terminated prior to the breakthrough of mercury. A heated regenerant stream is passed to the first gas purifier bed to desorb mercury and to provide a first spent regenerant stream. The first spent regenerant stream least two secondary adsorption beds. Each of the secondary adsorption beds contains a third regenerable adsorbent selective for the adsorption of mercury to produce a purified gas containing less than about 0.1 $\mu g/Nm^3$ mercury. The passing of the heated regenerant stream to the first gas purifier bed is terminated, the passing of the first spent regenerant stream to the cooler/condenser is terminated. The heated regenerant stream is passed to the first liquid purifier bed to regenerate the first liquid purifier bed and a second spent regenerant stream is withdrawn. The second spent regenerant stream is passed to the cooler/condenser. The passing of the heated regenerant stream to the first liquid purifier bed is terminated, the passing of the second spent regenerant stream to the cooler/condenser is terminated, and the passing of the cooled regenerant stream to the first secondary bed is terminated prior to mercury breakthrough. The heated regenerant stream is passed to the first secondary adsorption bed to regenerate the first secondary adsorption bed and a third spent regenerant stream is withdrawn and passed to the cooler/condenser. The passing of the heated regenerant stream to the first secondary adsorption bed is terminated, the passing of the third spent regenerant stream to the cooler/condenser is terminated and at least a portion of the purified gas stream is heated to provide a portion of the heated regenerant stream. The above steps, following the separation step are repeated to provide a continuous process.

BRIEF DESCRIPTION OF THE DRAWINGS

The drawing represents a schematic block flow diagram of the process of the present invention wherein a hydrocarbon feedstream is separated into a gaseous portion and a liquid portion and both portions are separately treated for removal of mercury while adsorption zones for such treatment are regenerated with common heating and mercury recovery.

DETAILED DESCRIPTION OF THE INVENTION

Preferred adsorbents are those which comprise constituents chemically reactive with mercury or mercury compounds. Various cationic forms of several zeolite species, including both naturally occurring and synthesized compositions, have been reported by Barrer et al. [J. Chem. Soc. (1967) pp. 19–25] to exhibit appreciable capacities for mercury adsorption due to the chemisorption of metallic mercury at the cation sites. Some of these zeolitic adsorbents reversibly adsorb mercury and others exhibit less than full, but nevertheless significant, reversibility. An especially effective adsorbent for use in the present process is one of the zeolite-based compositions containing cationic or finely dispersed elemental forms of silver, gold, platinum or palladium. A particularly preferred adsorbent of this type is disclosed in U.S. Pat. No. 4,874,525 (Markovs) wherein the silver is concentrated on the outermost portions of the zeolite crystallites. This adsorbent, as well as the other zeolite-based adsorbents containing ionic or elemental gold, platinum, or palladium, is capable of selectively adsorbing and sequestering organic mercury compounds as well as elemental mercury. Zeolite A containing elemental gold is disclosed as an adsorbent for mercury in the later issued U.S. Pat. No. 4,892,567 (Yan). The specific mention of these materials is not intended to be limiting, the composition actually selected being a matter deemed most advantageous by the practitioner give the particular circumstances to which the process in applied.

The temperature and pressure conditions for the filtration and the adsorption purification steps are not critical and depend to some degree upon the particular feedstock being purified and whether the adsorption step is to be carried out in the liquid or in the vapor phase. Temperatures typically range from about 16° C. to 60° C. in the beds during the adsorption-purification step. If the adsorption bed is to be regenerated the purge medium is heated to at least 100° C., and preferably at least 200° C., higher than the temperature of the feedstock being purified. Pressure conditions can range from about 140 kPa to about 17.5 Mpa (20 to 2500 psia) and are generally not critical, except of course during liquid phase operation wherein it is necessary to maintain sufficient pressure at the operating temperature to avoid vaporization of the feedstock.

DETAILED DESCRIPTION OF THE DRAWINGS

With reference to the drawing, a hydrocarbon feedstream comprising $C_1$ to $C_{10}$ hydrocarbons, mercury, and water is passed via line 10 to a separation zone 101 wherein the hydrocarbon feedstream is separated to produce a gaseous stream 12 comprising $C_1$–$C_3$ hydrocarbons, mercury and water, and a liquid hydrocarbon stream 14 comprising $C_3$+ hydrocarbons, mercury, and water. The gaseous stream 12 is passed to a first gas purifier bed 102 of at least two gas purifier beds (102 and 104), and a treated gas effluent stream having a reduced amount of mercury relative to the gaseous stream is withdrawn in line 16. Gas purifier bed 102 is shown operating in the adsorption mode while gas purifier bed 104 is shown in the desorption mode. Prior to mercury breakthrough, the operation is switched by techniques well known in the gas adsorption art and the first gas purifier bed 102 is regenerated while the other gas purifier bed 104 is placed in the adsorption mode. Each of the gas purifier beds comprises a fixed bed containing a first adsorbent zone selective for the reversible adsorption of water and a second adsorbent zone for the adsorption of water and mercury from the gaseous stream 12. Preferably, the first adsorbent zone contains a zeolite adsorbent selected from the group consisting of zeolite A, zeolite X, and the second adsorbent zone contains an adsorbent selected from the group consisting of zeolite A, zeolite X, and zeolite Y containing cationic or finely dispersed elemental forms of a metal selected from the group consisting of silver, gold, platinum, palladium, and mixtures thereof. More preferably, the first adsorbent zone contains a desiccant comprising zeolite A, or zeolite X, and a second adsorbent layer comprising zeolite A or zeolite X containing ionic or elemental silver.

The liquid hydrocarbon stream 14 is passed to a first liquid purifier bed 106 which is the first liquid purifier bed of at least two liquid purifier beds (106 and 108) and a treated liquid effluent having a reduced amount of mercury relative to the liquid hydrocarbon stream is withdrawn in line 18. Each of the liquid purifier beds, like the gas purifier beds, comprises a fixed bed containing a first adsorbent zone containing a desiccant such as zeolite A or X, and a second adsorbent zone selective for the reversible adsorption of water and mercury such as a molecular sieve zeolite selected from the group consisting of zeolite A, zeolite X, and zeolite Y containing cationic or finely dispersed elemental forms of a metal selected from the group consisting of silver, gold, platinum, palladium, and mixtures thereof. Preferably the second adsorbent zone of the liquid purifier bed comprises a zeolite A or zeolite X containing ionic or elemental silver. Liquid purifier bed 106 is shown in the adsorption mode while liquid purifier bed 108 is shown in a desorption mode. The operation of the liquid purifier beds 106 and 108 is periodically switched between adsorption and desorption mode prior to the breakthrough of mercury into the treated liquid effluent stream 18.

In the regeneration mode, a regenerant stream 20' comprising $C_1$–$C_2$ hydrocarbons is passed via line 20' and 21 to heater 109 to provide a heated regenerant stream 22. Preferably, the heated regenerant stream is heated to a regeneration temperature greater than about 200° C., and more preferably, the heated regenerant stream is heated to a regeneration temperature between about 200° C. and about 350° C. According to the present invention, the gas purifier bed 104 and the liquid purifier bed 108 are regenerated in a sequential manner using a common mercury recovery zone. The heated regenerant stream 22 is passed to gas purifier 104 in a direction countercurrent to the flow of gas during the adsorption mode to desorb mercury and water and to produce a spent regenerant stream 32 comprising mercury and water. The spent regenerant stream 32 is passed via lines 32, 34, and 38 to a cooler/separator comprising cooler 110 and separator 116, connected by line 40. Cooler 110 cools the spent regenerant stream to condense at least a portion of the mercury and a portion of the water desorbed from the first adsorbent zone to produce a cooled regenerant stream 46, a water stream 44, and a mercury stream 42. The cooled regenerant stream 46 is passed to a first secondary adsorption bed 114 of at least two secondary adsorption beds (114 and 112) to produce a purified gas stream 47 containing less than about 0.1 $\mu g/Nm^3$ of mercury. Each of the secondary adsorption beds like the gas purifier beds, and the liquid purifier beds comprises a fixed bed containing a first adsorbent zone containing a desiccant such as zeolite A or X, and a second adsorbent zone selective for the reversible adsorption of water and mercury such as a molecular sieve zeolite selected from the group consisting of zeolite A, zeolite X, and zeolite Y containing cationic or finely dispersed elemental forms of a metal selected from the group consisting of silver, gold, platinum, palladium, and mixtures thereof. Preferably the second adsorbent zone of the liquid purifier bed comprises a zeolite A or zeolite X containing ionic or elemental silver. The purified gas stream 47 is withdrawn for use as plant fuel via line 48. At least a portion of the purified gas stream 47 may be combined with the regenerant stream 20' via line 20. When the mercury has been removed from the first gas purifier bed 104, the passing of heated regenerant 26 to bed 104 and the passing of the spent regenerant stream 32 are terminated and the heated regenerant 27 is passed to the liquid purifier 108 in a direction countercurrent to the liquid flow during the adsorption mode to produce a second spent regenerant stream 33 which has the same composition as the spent regeneration stream 32 comprising mercury and water. The second spent regenerant stream 33 is passed to the cooler/separator via lines 33, 34, and 38 to produce the cooled regenerant stream 46, the water stream 44, and the mercury stream 42. The cooled regenerant stream 46 continues to be passed to the first secondary adsorbent bed 114 for the production of the purified gas stream 47. Preferably the temperature of the cooled regenerant stream ranges between about 20 and about 45° C., and more preferably the temperature of the cooled regenerant steam is less than about 25° C. When the liquid purifier bed 108 has been regenerated, the passing of the heated regenerant stream thereto and the passing of the second spent regenerant stream 33 are terminated and the heated regenerant stream 22 is passed to the other secondary adsorbent bed 112 via line 30 in a direction countercurrent to the gas flow during the adsorption mode to desorb mercury and water and to produce the third spent regenerant stream 36.

The third spent regenerant stream 36 is passed to the cooler 110/separator 116 to provide the cooled regenerant stream 46, the water stream 44, and the mercury stream 42. The cooled regenerant stream is passed to the first secondary adsorbent bed 114 to produce the purified gas stream 47. Thus, the regeneration of the gas purifier bed 104, the liquid purifier bed 108, and the secondary adsorbent bed 112 is carried out sequentially with a common cooler 110/separator 116 to provide a continuous process and a continuous regeneration cycle. Preferably, the total regeneration cycle time including cooling the beds to adsorption conditions comprises 30–60 percent for the regeneration of the gas purifier bed, 20–50 percent for the regeneration of the liquid purifier bed, and 5–20 percent for the regeneration of the secondary adsorbent bed. Following the termination of passing heated regenerant to each of the beds undergoing regeneration, the beds are cooled by the passing of unheated regenerant or purified gas in the conventional manner.

EXAMPLES

The following example is provided to illustrate the present invention and is not intended to limit the scope of the claims that follow.

Example I

A feedstream comprising natural gas is separated in a natural gas plant separation zone to provide a 250 MT/HR gaseous stream having a molecular weight of about 20 and a mercury content of about 10 $\mu g/Nm^3$ and a 31.5 MT/HR liquid hydrocarbon stream having a molecular weight of about 65 and a mercury content of about 5 ppb-wt. Both the gaseous stream and the liquid hydrocarbon stream are saturated with water at about 27° C. and 7 MPA. The gaseous stream and the liquid hydrocarbon stream were further processed according to the flow scheme shown in the drawing. The gas purifier bed produces a treated gas effluent comprising less than about 0.1 $\mu g/Nm^3$ and about 0.1 ppm-vol water, and the liquid purifier bed produces a treated liquid effluent having a mercury content less than about 1 ppb-wt and having less than about 1 ppm-wt water. According to the process of the present invention about 4 MT/HR of a $C_1$–$C_2$ regenerant gas was heated to a regeneration temperature of about 280 to 300° C. to provide a heated regenerant stream which was passed to the gas purifier bed 104, the liquid purifier bed 108, and the secondary adsorbent bed 112 for periods of 12 hours, 8 hours, and 4 hours, respectively, including the time required for the adsorbent beds to be cooled to adsorption conditions. The cooler 110 reduces the temperature of the spent regenerant to a temperature of about 20 to about 45° C. to recover about 75 grams of mercury per day, or about 99.9 percent of the mercury in the feedstream. The water stream 44 recovered from the spent regenerant comprises about 25 ppb-wt mercury based on the solubility of mercury in water at about 20° C.

I claim:

1. A process for recovering and removing mercury from a gaseous stream comprising $C_1$–$C_3$ hydrocarbons water, and mercury and a liquid hydrocarbon stream comprising $C_3$+ hydrocarbons, water, and mercury, said process comprising the steps of:

a) passing said gaseous stream to a first gas purifier bed of at least two gas purifier beds each of said gas purifier beds being a fixed bed containing a first regenerable adsorbent selective for the adsorption of mercury and water to provide a treated gas effluent having a reduced amount of mercury relative to said gaseous stream and passing said liquid hydrocarbon stream to a first liquid purifier bed of at least two liquid purifier beds each liquid purifier bed being a fixed bed containing a second regenerable adsorbent selective for the adsorption of mercury and water to produce a treated liquid effluent having a reduced amount of mercury relative to said liquid hydrocarbon stream;

b) passing a heated regenerant stream to the first gas purifier bed to regenerate said first gas purifier bed and to produce a first spent regenerant stream and passing the first spent regenerant stream to a common mercury recovery zone to provide a cooled regenerant stream, a water stream and a mercury stream;

c) terminating the passing of the heated regenerant stream to the first gas purifier bed and the passing of the first spent regenerant stream to the common recovery zone and passing the heated regenerant stream to the first liquid purifier bed to sequentially regenerate the first liquid purifier bed and to produce a second spent regenerant stream and passing the second spent regenerant stream to the common mercury recovery zone;

d) terminating the passing of the heated regenerant stream to the first liquid purifier bed and the passing of the second spent regenerant stream to the common recovery zone and passing the cooled regenerant stream to a first secondary adsorption bed of at least two secondary adsorption beds each secondary adsorption bed being a fixed bed containing a third regenerable adsorbent selective for the adsorption of mercury to provide a purified gas stream, terminating the passing of the cooled regenerant stream to the first secondary adsorption bed prior to mercury breakthrough, and passing the heated regenerant stream to the first secondary adsorption bed to sequentially regenerate the first secondary adsorption bed and to provide a third spent regenerant stream and passing the third spent regenerant stream to said common mercury recovery zone; and, e) repeating steps (a) to (d) to provide a continuous process.

2. The process of claim 1 wherein said first, second, and third regenerable adsorbents comprise a zeolite molecular sieve containing cationic or finely dispersed elemental forms of a metal selected from the group consisting of silver, gold, platinum, palladium, and mixtures thereof.

3. The process of claim 2 wherein said zeolite molecular sieves are selected from the group consisting of A, X, and Y zeolites.

4. The process of claim 1 wherein the gas purifier beds, the liquid purifier beds and the secondary adsorption beds each contain a first adsorbent zone containing a desiccant and second adsorbent zone containing a zeolite A or zeolite X containing ionic or elemental silver.

5. The process of claim 1 wherein the recovery of mercury in said mercury stream comprises greater than about 80 wt % of the mercury in said feedstream.

6. A process for recovering and removing mercury from a hydrocarbon feedstream comprising $C_1$–$C_{10}$ hydrocarbons, water, and mercury, said process comprising the steps of:

a) separating the hydrocarbon feedstream in a separation zone to provide a gaseous stream comprising $C_1$–$C_3$ hydrocarbons and a liquid hydrocarbon stream comprising $C_3$+ hydrocarbons, both said gaseous stream and said liquid hydrocarbon stream comprising mercury and water;

b) passing said gaseous stream to a first gas purifier bed of at least two gas purifier beds each of said gas purifier beds being a fixed bed containing a first regenerable adsorbent selective for the adsorption of mercury and water to provide a treated gas effluent having a reduced amount of mercury relative to said gaseous stream and passing said liquid hydrocarbon stream to a first liquid purifier bed of at least two liquid purifier beds each liquid purifier bed being a fixed bed containing a second regenerable adsorbent selective for the adsorption of mercury and water to produce a treated liquid effluent having a reduced amount of mercury relative to said liquid hydrocarbon stream;

c) terminating prior to mercury breakthrough the passing of said gaseous stream to said first gas purifier bed and terminating prior to mercury breakthrough the passing of said liquid hydrocarbon stream to said first liquid purifier bed;

d) passing a heated regenerant stream to said first gas purifier bed to desorb mercury and provide a first spent regenerant stream and passing said first spent regenerant stream to a condenser/separator to provide a cooled regenerant stream, a water stream, and a mercury stream;

e) passing said cooled regenerant stream to a first secondary adsorption bed of at least two secondary adsorption beds each of said secondary adsorption beds containing a third regenerable adsorbent selective for the adsorption of mercury to produce a purified gas stream containing less than about 0.1 $\mu$g/Nm$^3$ of mercury;

f) terminating the passing of said heated regenerant stream to said first gas purifier bed, terminating the passing of the first spent regenerant stream to the cooler/condenser, and passing said heated regenerant stream to said first liquid purifier bed to regenerate said first liquid purifier bed and withdrawing a second spent regenerant stream and passing the second spent regenerant stream to the cooler/condenser;

g) terminating the passing of said heated regenerant stream to said first liquid purifier bed, terminating the passing of the second spent regenerant stream to the cooler/condenser, terminating the passing of said cooled regenerant stream to said first secondary adsorption bed prior to mercury breakthrough, passing said heated regenerant stream to said first secondary adsorption bed to regenerate said first secondary adsorption bed and withdrawing a third spent regenerant stream and passing the third spent regenerant stream to the cooler/condenser;

h) terminating the passing of said heated regenerant stream to said first secondary adsorption bed, terminating the passing of the third spent regenerant stream to the cooler/condenser and heating at least a portion of the purified gas stream to provide a portion of said heated regenerant stream;

i) repeating steps (b) through (h) to provide a continuous process.

7. The process if claim 6 wherein said cooled regenerant stream comprises a temperature from about 20° to about 45° C.

8. The process if claim 6 wherein said cooled regenerant stream comprises a temperature less than about 2° C.

9. The process of claim 6 wherein the separation zone comprises a single or a multiple zone flash of the hydrocarbon feedstream.

10. The process of claim 9 wherein said separation zone contains a mechanical removal device selected from the group consisting of filtration and centrifugation.

11. The process of claim 1 further comprising heating at least a portion of the purified stream to provide said heated regenerant stream.

12. The process of claim 1 wherein the purified gas comprises less than about 0.1 $\mu$g/Nm$^3$ mercury.

* * * * *